Feb. 12, 1935.  A. URFER  1,991,129
MEANS FOR INDICATING RELATIVE ANGULAR MOVEMENTS
Filed July 30, 1930
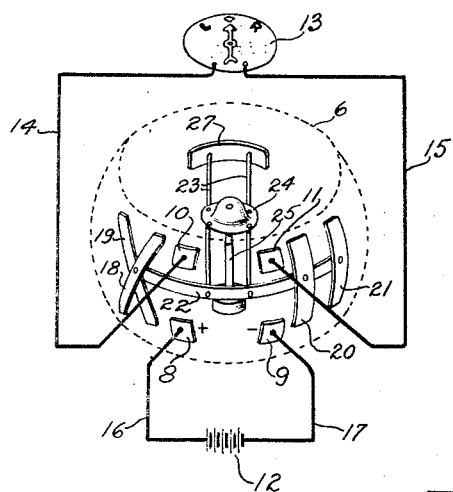
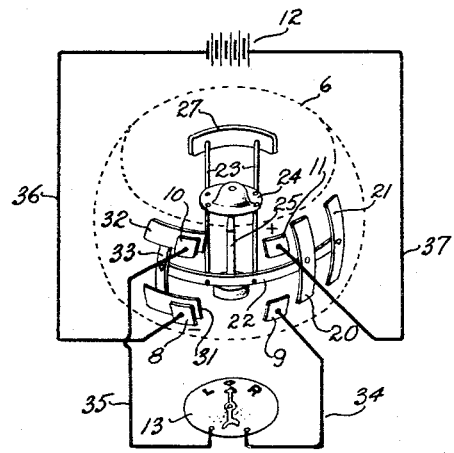
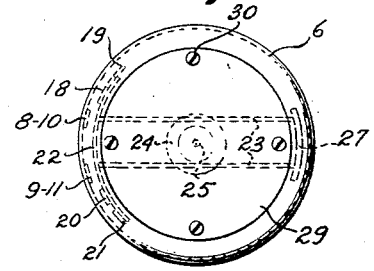
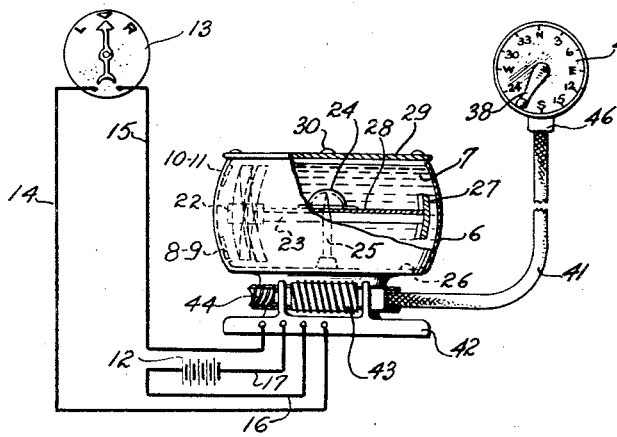
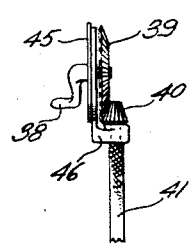
Inventor
Adolf Urfer
By F. R. Smith.
Attorney Patented Feb. 12, 1935

1,991,129

UNITED STATES PATENT OFFICE 1,991,129

MEANS FOR INDICATING RELATIVE ANGULAR MOVEMENTS

Adolf Urfer, Richmond Hill, N. Y., assignor to Pioneer Instrument Company, Incorporated, Brooklyn, N. Y., a corporation of New York Application July 30, 1930, Serial No. 471,877

4 Claims. (Cl. 201—57)

The present invention relates to means for indicating relative angular movements between objects and more particularly to means for indicating the deviation of a mobile object from a predetermined or selected path or course.

One of the objects of the invention is to provide a novel electrical control system which is so designed as to depend for operation upon changes of direction of the current flow in an electrical circuit due to changes in the resistance thereof produced by relative angular movement between a directional element and a mobile object carrying the latter.

Another object is to provide novel electrical apparatus of the above-mentioned type for changing the direction of current flow in an electrical circuit by changing the resistance thereof in accordance with the relative angular movement between certain of the elements of said apparatus and for indicating the direction of said current flow in accordance with the direction of said angular movement.

Another object is to provide in combination with a directional or a controlling device, such as a magnetic compass, novel electrical means for indicating differences in the relative angular position between the directional device and a mobile object, such as a ship or aircraft, on which said device is mounted.

Still another object of the invention is to provide in combination with a magnetic compass, novel electrical means including an indicator or indicators located at a distance from said compass for indicating relative angular movement between the magnetic element or elements of the compass and a mobile object on which said compass is mounted.

A still further object is to provide in combination with a compass and novel electrical control apparatus therefor, means for predetermining and setting a course to be followed by the mobile object on which said compass is mounted, and for indicating at a convenient point or points, which latter may be at a distance from the compass, angular deviations of said mobile object from the predetermined or selected course.

Other objects and advantages of the invention will appear more fully hereinafter from the following description taken together with the accompanying drawing, which illustrates two embodiments of the invention. It is to be expressly understood, however, that the drawing is for purposes of illustration and description only, and is not designed as a definition of the limits of the invention, reference being had for this purpose to the appended claims.

In the drawing, wherein like reference characters refer to like parts throughout the several views, Fig. 1 is a perspective view, partially diagrammatic, illustrating one embodiment of the invention;

Fig. 2 is a similar view illustrating another embodiment;

Fig. 3 is a plan view of the directional device of the apparatus;

Fig. 4 is an elevation, partially diagrammatic, of one form of the course-setting mechanism together with the control device and deviation indicator, part of the control device being broken away; and Fig. 5 is a side elevation of the course-setting mechanism shown in Fig. 4.

Referring to the drawing, the form of the invention illustrated therein comprises a container 6, which may be of some suitable insulating material such as glass, porcelain, or hard rubber, for example, preferably the latter, having an electrolyte 7 therein. The electrolyte may be composed of distilled water, slightly acidulated with hydrochloric acid or other suitable electrolytic means. Carried by the container on the inside thereof, and immersed in the electrolyte 7 are electrodes 8, 9, 10, and 11 arranged in spaced relation and sufficiently apart from each other to preclude a flow of current from one to the other through the electrolyte. Electrodes 8, 9, 10, and 11 may be of any suitable conducting material, preferably non-metallic, as for example, carbon, graphite, or some other allotropic form of carbon, and are arranged in an electrical circuit which includes a source of direct current 12 and a current-indicating device 13, which may be a galvanometer or any other equivalent electrical indicating instrument. The electrodes 10 and 11 are connected to said instrument 13 by leads 14 and 15, while electrodes 8 and 9 are connected to the source 12 by leads 16 and 17. Because of the relatively long path through the electrolyte between electrodes 10 and 8 and electrodes 11 and 9, the resistance of said paths will be very high, and substantially little or no current will flow from the source 12 to the indicating device 13, thus producing, in effect, an open circuit.

Means are provided for decreasing the electrolytic resistance of the paths 10—8 and 11—9 to a very low value thereby closing the electrical circuit through electrodes 8 and 10 and electrodes 9 and 11 to cause a current to flow through the circuit in one direction or in an opposite direction and comprises two pairs of conducting elements 18 and 19 and 20 and 21 attached in any suitable manner, as by rivets, to an arcuate insulating member 22 carried by the magnetic elements or compass needles 23 and rotatable therewith, said conducting elements 18 and 19 being adapted to bridge the electrodes 8, 11 and 9, 10, while electrodes 20 and 21 are adapted to bridge electrodes 8, 10 and 9, 11, depending on the relative movement between the magnetic needles 23 and the container 6 being in one direction or another. Elements 18 and 19 are positioned on one end of the insulating member 22 in crossed position and are separated thereby to prevent their being short circuited, while elements 20 and 21 are positioned on the opposite end of member 22 in parallel spaced relation, as indicated in Fig. 1. Compass needles 23 are held parallel and carried by a bracket 24, which also serves as a pivoting means for said needles, said bracket being supported by a pivot member 25 which projects upward from the center of the bottom 26 of the container 6, as shown in Fig. 4. Carried by and attached to the ends of the magnetic needles 23 opposite the ends which carry the insulated member 22, is a balancing element 27 for maintaining the needles in a horizontal position.

A card 28, which, for example, may be circular to conform with the shape of the bowl or container 6, is attached to the bracket 24 and the needles 23 for reducing the oscillations of said needles in a vertical plane. The card has been omitted from the views in Figs. 1 and 2 in order that the various elements may be seen in their cooperative positions but a cross-section of the card is shown in Fig. 4. The card may be marked with the cardinal points of the compass to serve as a compass rose, if desired, and the container provided with a suitable lubber's mark, in which case the cover of the container may be made of some transparent material such as glass, so that the card may be visible therethrough. Otherwise the cover may simply comprise a plate 29 secured to the container 6 by means of screws 30, as indicated in Figs. 3 and 4.

It will be apparent that the magnetic needles 23 will tend to remain in a north-south position relative to the earth's magnetic field so that the electrolytic resistance of the paths between electrodes 8, 10 and 9, 11 will be very high and the circuit will in effect remain open, and hence no current will flow to the circuit from source 12 to the indicating device 13, but when relative angular movement takes place between the needles and the container, electrodes 8, 10 and 9, 11 will be bridged by conducting elements 20, 21 when said relative movement is in one direction and electrodes 9, 10 and 8, 11 will be bridged when relative movement is in the opposite direction, thereby decreasing the electrolytic resistance of the circuit, in either case, to an extremely low value, thus in effect closing said circuit. Accordingly, in the first case, current will flow from source 12 through lead 16, electrode 8, element 20, electrode 10, lead 14, through the indicating instrument 13, lead 15, electrode 11, element 21, electrode 9, and through lead 17 back to the source 12. In the second case, current will flow from the source 12 through lead 16, electrode 8, conducting element 18, electrode 11, lead 15, through the indicating instrument 13 in a direction opposite to that of the first case, lead 14, electrode 10, conducting element 19, electrode 9, and through lead 17 back to the source 12. Therefore, if the compass bowl 6 be carried by a mobile object, such as a ship or aircraft, it will be seen that when the mobile object veers to the left the indicator 13 will give a "left" indication, and when it veers to the right the indicator will give a "right" indication.

In Fig. 2 is shown another embodiment of the invention, in which conducting elements 31 and 32 are substituted for conducting elements 18 and 19 of Fig. 1 and are arranged horizontally in parallel spaced relation by means of insulating strip 33 carried by the arcuate insulating member 22. The conducting elements 31 and 32 are adapted to bridge the electrodes 8, 9 and electrodes 10, 11, respectively. The circuit arrangement is slightly modified in that electrodes 9 and 10 are connected to the indicator 13 by leads 34 and 35, while electrodes 8 and 11 are connected to the source 12 by leads 36 and 37. The function and operation, however, is the same as that in Fig. 1 in that when relative movement between the magnetic needles and the container is in one direction the electric circuit is closed by elements 31 and 32 bridging electrodes 8, 9 and 10, 11, respectively, while relative movement in the other direction causes elements 20 and 21 to bridge electrodes 8, 10 and 9, 11, respectively, thereby causing current to flow in one direction or in an opposite direction.

There are thus provided novel means for indicating the deviation of a mobile object from a set path or course.

Course-setting mechanism is also provided for predetermining and setting a selected path or course to be followed by the mobile object on which bowl 6 is mounted. As shown in Fig. 4, this mechanism includes a crank 38 connected to a bevel gear 39 so that the gear may be rotated thereby. A pinion 40 is arranged to mesh with the gear 39 to actuate a flexible shaft 41 which extends to the base 42 of the bowl 6 and is provided with a worm 43, the latter meshed with a worm wheel 44 carried by the base 42 of the rotatable bowl 6. Coöperating with the crank 38 is a stationary dial 45 attached to the bracket 46 adapted to be mounted on the instrument panel adjacent the indicating device 13, the latter being connected to the electrodes in the bowl, as hereinbefore explained. The front of the dial 45 is marked with the cardinal points of the compass and further subdivided into intermediate divisions representing degrees from zero to 360.

When it is desired, for example, to pilot the ship or aircraft carrying the apparatus on a set course, crank 38 is rotated to the marking on the dial 45 representing the desired course, which simultaneously rotates the bowl 6 by means of flexible shaft 41. Rotation of bowl 6 will be indicated on the device 13 by means of its pointer, and now the mobile object may be steered to the predetermined or selected course until the pointer is in the center, or zero position, of its scale, indicating that the ship or aircraft is on the course, as hereinbefore explained. Any deviation from said course will cause current to flow through the indicator 13 in one direction or another, depending on the direction of said deviation, which will cause a corresponding deviation on said indicator.

From the foregoing description, it will be seen that there is disclosed a novel method of indicating differences in angular position between a directional device and a mobile object on which the device is mounted, which consists primarily in causing a reversal of current flow in an electrical circuit in accordance with relative angular movement between the directional device and the mobile object and indicating the direction of said current flow. It will also be seen that novel means are provided in combination with a magnetic compass for accurately and effectively repeating relative angular movements between a mobile object and directional elements of the compass, thereby enabling the pilot or navigator of said mobile object, which may be a ship or aircraft, to quickly perceive, at a point or points, which may, if it is desired, be located at a distance from the compass, whether he is on or off his course and to pilot the craft accordingly. The device is quite simple, easily constructed, thereby reducing the cost of manufacture, and yet is rugged enough to withstand hard uses under trying conditions generally encountered in aerial navigation, for example, without sacrificing or decreasing the efficiency of the device. The magnetic compass may be mounted in any convenient location on a ship or aircraft, while the indicator or repeater which is operated thereby may be conveniently mounted on the instrument panel in the cockpit of an aircraft or on the bridge of a vessel, etc.

Various changes and modifications may be made in the apparatus, such as changes in form and arrangement of parts, without departing from the scope of the invention. It may also be apparent that a follow-up system of any well known type may be used with the compass whereby the compass bowl 6 may be made to follow up the compass needles 23 and returned to its normal or neutral position relative to said needles in which case the indicator 13 may be replaced by a polarized two-way relay to actuate a reversible follow-up motor which would simultaneously rotate the bowl and a repeating compass card for indicating the relative angular movements between the mobile object and the compass needles. Reference will therefore be had to the appended claims for a definition of the limits of the invention.

What is claimed is:

1. An electrolytic rheostat for operating an electro-responsive indicator to indicate deviation of a mobile object from a predetermined path or course, comprising in combination, a container having an electrolyte therein, a directional element pivotally mounted in said container, a plurality of stationary conductors carried by said container and in contact with said electrolyte, a plurality of movable conductors carried by said directional element and also in contact with said electrolyte and movable with said element, a source of direct current, and an electrical circuit including said electrolyte, said stationary conductors and said source, the movable conductors being so arranged with respect to the stationary conductors that certain of the former bridge the latter when the mobile object deviates in one direction, and so that the others of the movable conductors bridge the same stationary conductors in a manner to reverse the flow of current when the mobile object deviates in an opposite direction.

2. In an electrolytic rheostat, the combination of a container having an electrolyte therein, a plurality of fixed electrodes carried by said container and in contact with said electrolyte, a source of direct current, an electrical circuit including said electrolyte, said electrodes and said source, and means for automatically reversing the current flow in said circuit by relative angular movement between the electrodes and said means, said means comprising a plurality of movable conductors so arranged with respect to the fixed electrodes that certain of the former bridge the latter when the relative angular movement is in one direction, and so that the others of the movable conductors bridge the same fixed electrodes in a manner to reverse the flow of current when the angular movement is in an opposite direction.

3. An electrolytic rheostat for operating an electro-responsive indicator to indicate relative angular movement between a mobile object and a directional element carried by said object, comprising in combination, an insulating container for said element, an electrolyte in said container, a plurality of fixed electrodes of an allotropic form of carbon carried by said container and in contact with said electrolyte, a source of electrical energy, an electrical circuit including said electrolyte, said electrodes and said source, an insulating member carried by said directional element, and movable therewith, and means attached to said insulating member for reversely closing said circuit by relative angular movement between said directional element and said mobile object to cause current to flow in said circuit in one direction or another depending on the direction of the relative angular movement, said means comprising a plurality of conductors arranged in pairs and adapted to alternately bridge said fixed electrodes.

4. An electrolytic rheostat for operating an electro-responsive indicator to indicate relative angular movement between a mobile object and a directional element carried by said object, comprising in combination, an insulating container for said element, an electrolyte in said container, a plurality of fixed electrodes of an allotropic form of carbon carried by said container and in contact with said electrolyte, a source of electrical energy, an electrical circuit including said electrolyte, said electrodes and said source, an arcuate insulating member carried by said directional element and movable therewith, and a pair of conductors attached to each end of said insulating member for alternately bridging said fixed electrodes to reversely close said circuit by relative angular movement between said directional element and the mobile object to cause current to flow in said circuit in one direction or another depending on the direction of the relative angular movement.

ADOLF URFER.